United States Patent Office 3,085,902
Patented Apr. 16, 1963

3,085,902
PROCESS FOR MAKING CELLULOSIC MATERIALS WATER REPELLENT
John S. Burns, Mercer Island, Wash., assignor to Van Waters & Rogers, Inc., Seattle, Wash., a corporation of Washington
No Drawing. Filed Nov. 16, 1959, Ser. No. 852,950
2 Claims. (Cl. 117—76)

The present invention relates to a process for making cellulosic materials such as paper and various wood products water repellent and involves the use of coatings of colloidal silica and silicones.

The water repelling characteristic of silicones is well known but heretofore has not been applied to paper and other cellulose products in a fully satisfactory manner. Treatment of paper with methylchlorosilane vapor to deposit a thin film of methylpolysiloxane has been performed by hydrochloric acid is formed in the process which will weaken the paper by degradation of the cellulose if not neutralized immediately. Even though continuous treating techniques are used in which the paper is exposed to ammonia vapours after the silane vapor, neutralization of the hydrochloric acid is not completely effective and so the paper is weakened.

To avoid this danger silicone fluids have been applied to cellulosic paper from emulsion or solution but the silicone pickup by the cellulose is limited and so adequate water repellency for many applications cannot be obtained.

It has also been desirable to coat paper with releasing agents based on silicone rubbers. To increase the silicone pickup for this purpose various precoatings have been applied such as water-soluble urea-formaldehyde resins when the silicone polymer is to be applied as an aqueous emulsion, and butadiene-styrene latex and nitrocellulose when the polymer is in a solvent-diluted form. However, even when such a precoating is performed the silicone pickup is not adequate for the desired degree of water repellency, and perforce such precoatings are not suitable for most normal paper uses.

I have discovered that a precoating of colloidal silica sol to cellulosic materials will materially increase their capability for silicone pickup. In the past paper containers have been surface treated with colloidal silica to give an anti-slip characteristic as taught in U.S. Patent 2,643,048 to Wilson. Colloidal silica may be obtained from any suitable source for the present purpose as, for example, from silica aquasols, silica organosols and the like or from solutions comprising a suitably dispersed colloidal silica aerogel. As examples of such solutions may be mentioned aqueous solutions containing organic solvents, organic solvent solutions, oil solutions and the like and more particularly aqueous solutions comprising colloidally dispersed alkali-stabilized silica aerogels which have been reduced to a fine size. Silica aquasols of the type described may be prepared in any suitable manner, for example, as shown in U.S. Patents 2,244,325 to Bird, 2,574,902 to Bechtold and Snyder, and 2,577,485 to Rule. Silica organo-aquasols and silica organosols may be prepared, for example, as shown in Marshall Patent 2,285,-449 and White Patent 2,285,477. Silica aerogels may be prepared as shown in Marshall Patent 2,285,449 and may be suitably dispersed in colloidal form in a liquid medium.

A preferred source of colloidal silica is stabilized silica aquasols having a pH of from about 7 to 10.5 prepared, for example, according to the teachings of U.S. Patents 2,574,902 and 2,577,485, and available commercially as "Ludox" by E. I. du Pont de Nemours & Co., Inc. This product contains 30% colloidal silica by weight as $SiO_2$ with a particle diameter averaging about 20 millimicrons and can be diluted to concentrations of between about 1% and 15% for the present invention.

The colloidal silica may be incorporated on the surface of paper in a variety of ways such as by spraying, brushing, rolling, dipping, etc., or the colloidal silica may be suitably incorporated in cellulose pulp which is subsequently fabricated into paper.

After the paper or other cellulosic material is precoated with colloidal silica and dried it is treated with a suitable water emulsion or solvent silicone system resulting in absorption of the silicone to the silica. The silicone may be applied during the paper processing as, for example, on the paper machine, and it can be successfully applied to kraft and parchment at the size press. If desired it can be applied after paper manufacture by spraying, brushing, rolling, dipping etc. Heat may of course be applied for speeding drying both after the application of the silica and the silicone.

*Example 1*

Two samples each of kraft and parchment papers were taken from like stock and one of each kind was dipped into Ludox diluted by water to a 3% $SiO_2$ concentration. The wetted samples were dried at room temperature. All of the samples were then dipped into a water dispersion of a methyl silicone emulsion having about 5% silicone by weight (diluted "SM–55" produced by the General Electric Company). After drying the samples were dipped in water and it was readily apparent which two had been precoated with colloidal silica. These precoated samples could not be wetted whereas the other two samples, although primarily remaining dry, clearly had wetted areas.

*Example 2*

Samples of particle-board, plywood, and wood-fibre acoustical tile were partially coated by brush application with Ludox diluted by water to a 5% $SiO_2$ concentration. After drying of this precoating the samples were coated on both precoated and virgin surfaces with a film of methyl silicone resin having a silicone content of about 7% by weight (solvent-diluted "Dri-Film 103" produced by the General Electric Company). After drying the samples were dipped in water and the precoated surfaces were not wetted whereas the other silicone treated surfaces, although primarily remaining dry, clearly had wetted portions.

A great variety of silicone formulations well known in the art for their water repellency characteristic can be used in place of the particular silicones noted in the above examples, the present invention residing, not in a particular silicone but in the manner in which I have made it possible for cellulosic materials to be so treated as to take full advantage of said characteristic.

What I claim, is:
1. A process for making cellulosic materials of wood derivation water repellent consisting of the steps of applying a precoating of silica aquasol having from about

1 to 15% concentration of $SiO_2$, drying said precoating, and applying a water repellent silicone thereby giving absorption of the silicone to the silica.

2. The process of claim 1 in which said water repellent silicone consists of methyl silicone having about 5% silicone by weight.

References Cited in the file of this patent

UNITED STATES PATENTS

| | | |
|---|---|---|
| 2,510,661 | Safford | June 6, 1950 |
| 2,561,362 | Guillot | July 24, 1951 |
| 2,647,069 | Stericker | July 28, 1953 |
| 2,754,224 | Carosell | July 10, 1956 |
| 2,791,262 | Budnik | May 7, 1957 |
| 2,872,094 | Leptien | Feb. 3, 1959 |
| 2,930,106 | Wrotnowski | Mar. 29, 1960 |
| 3,004,871 | Leavitt | Oct. 17, 1961 |

FOREIGN PATENTS

| | | |
|---|---|---|
| 796,141 | Great Britain | June 4, 1958 |